(12) United States Patent
Hong et al.

(10) Patent No.: US 6,676,884 B2
(45) Date of Patent: Jan. 13, 2004

(54) DUAL-STRUCTURE HELMET AND METHOD OF MANUFACTURING THE SAME

(75) Inventors: Wan-Ki Hong, Seoul (KR); Myung-Ho Jung, Songnam-shi (KR); Dae-Ki Park, Yongin-shi (KR); Seung-Han Park, Yongin-shi (KR)

(73) Assignee: Hong Jin Crown Corp., Ltd., Yongin (KR)

( * ) Notice: Subject to any disclaimer, the term of this patent is extended or adjusted under 35 U.S.C. 154(b) by 0 days.

(21) Appl. No.: 10/272,163

(22) Filed: Oct. 16, 2002

(65) Prior Publication Data

US 2003/0049431 A1 Mar. 13, 2003

Related U.S. Application Data

(62) Division of application No. 09/450,328, filed on Nov. 29, 1999, now Pat. No. 6,468,644.

(30) Foreign Application Priority Data

Oct. 26, 1999 (KR) ............................................ 99-46641

(51) Int. Cl.⁷ .............................................. B29C 49/20
(52) U.S. Cl. ........................ 264/510; 264/516; 156/156; 156/212; 156/475
(58) Field of Search ................................. 264/510, 136, 264/324, 257, 267, 268, 516; 156/212, 156, 475

(56) References Cited

U.S. PATENT DOCUMENTS

| 3,234,309 A | * | 2/1966 | Graff ........................... 264/516 |
| 4,550,044 A | * | 10/1985 | Rosenberg et al. .......... 428/101 |
| 4,778,638 A | * | 10/1988 | White ......................... 264/152 |

* cited by examiner

Primary Examiner—Suzanne E. McDowell
(74) Attorney, Agent, or Firm—R. Neil Sudol; Henry Coleman; William Sapone

(57) ABSTRACT

Disclosed is a helmet or a safety cap for protecting the rider's head and a method of manufacturing the same, in which the main body of the helmet has a dual-structure so as to reduce work process when an outer surface of the helmet is painted, and weight thereof. The main body of the helmet has a dual-structure in that an outer surface thereof is formed of a thermoplastic for an aesthetic enhancement and an inner surface thereof is formed of FRP or a mixture of aramide fiber, polyethylene fiber, vinylon, carbon fiber. Thus-formed dual structure of the helmet body contributes to enhancement in impact resistance and convenience in painting, decreasing an overall weight of the helmet.

2 Claims, 5 Drawing Sheets

DUAL-STRUCTURE HELMET AND METHOD OF MANUFACTURING THE SAME

This application is a division of pending application Ser. No. 09/450,328, filed Nov. 29, 1999, now U.S. Pat. No. 6,468,644.

BACKGROUND OF THE INVENTION

1. Field of the Invention

The present invention relates to a helmet or a safety cap for protecting the rider's head, and more particularly, to a helmet main body of which is dually structured and a method of manufacturing the same.

2. Description of the Related Art

A typical helmet has a body thereof which is formed of fiber reinforced plastics (FRP) or thermoplastics for an impact resistance enhancement. An impact absorber 15 and an interior substance 16 are provided in the body of helmet.

However, in such a conventional helmet body which is formed of FRP, fiberglass and polyethylene fiber are woven into mat or fiber texture which makes surface of the helmet body uneven. In addition, the conventional helmet body is disadvantageous in that polyester resin mixed to the fiber texture for an improvement in strength and impact resistance causes coarse surface of the helmet body and increased weight thereof.

Further, surface of a conventional helmet needs to be ground when painting is to be performed on the surface. Such an additional grinding process degrades operation efficiency and makes an overall work procedure more complicated.

When the thermoplastic resin is injection-molded using a mold, the resultant helmet is provided with a surface enhanced in aesthetic point of view. However, the thermoplastic resin which is formed to a thickness same as that of FRP causes a significantly deteriorated strength and impact resistance. Therefore, to enhance strength and impact resistance of a helmet body, thickness thereof has to be increased, thereby increasing weight thereof too.

SUMMARY OF THE INVENTION

Therefore, it is an object of the present invention to provide a helmet of which main body has a dual-structure so as to reduce work process when a painting is performed on a surface of the helmet, and enhance impact resistance.

The present invention is characterized in that the main body of helmet has a dual structure in that an outer layer thereof is plastic-molded so as to obtain an aesthetic surface, and an inner layer thereof is formed of FRP or a mixture of aramide, polyethylene fiber, vinylon fiber, and carbon fiber, which have excellent impact resistance.

To accomplish the above object of the present invention, there is provided a helmet for protecting motorcycle, snow mobile, or bicycle rider's head, in which a main body of the helmet has a dual-structure so as to reduce work process when an outer surface of the helmet is painted, and weight thereof. The main body of the helmet has a dual-structure in that an outer surface thereof is formed of a thermoplastic for an aesthetic enhancement and an inner surface thereof is formed of FRP or a mixture of aramide fiber, polyethylene fiber, vinylon, and carbon fiber. Thus-formed dual structure of the helmet body contributes to enhancement in impact resistance and convenience in painting, decreasing an overall weight of the helmet.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE PRESENT INVENTION

Figure 1:
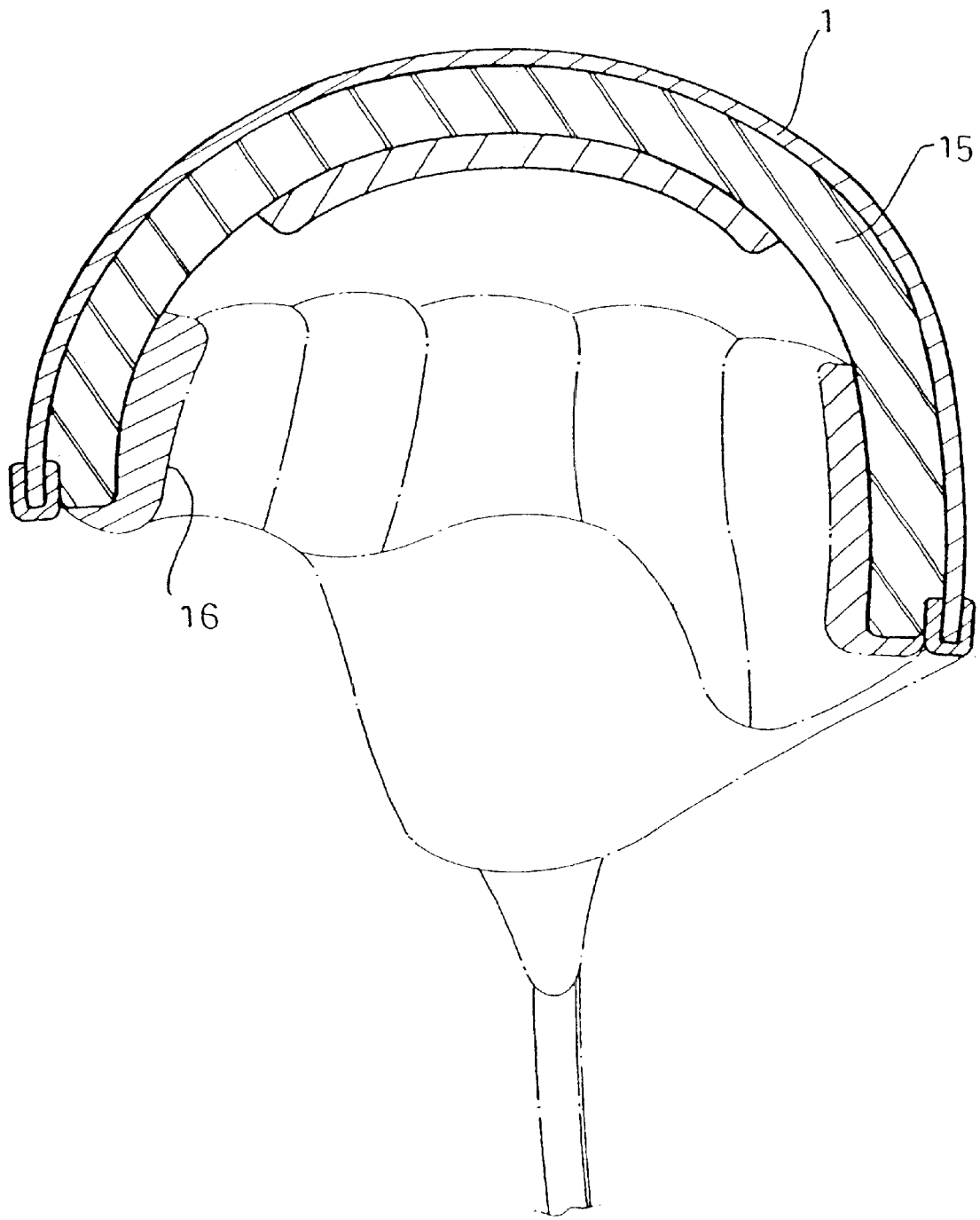
FIG. 1 is a sectional view illustrating configuration of a conventional helmet.
Figure 2:
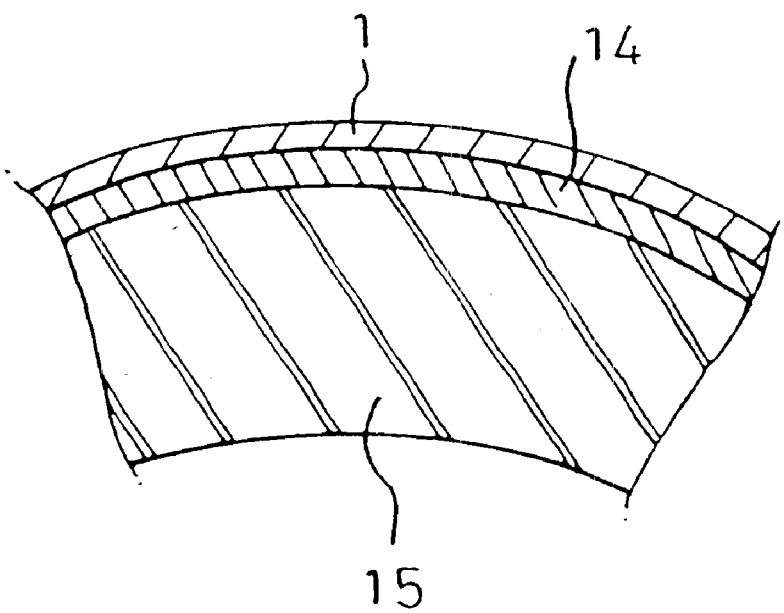
FIG. 2 is an expanded view illustrating configuration of a helmet according to the present invention.
Figure 3:
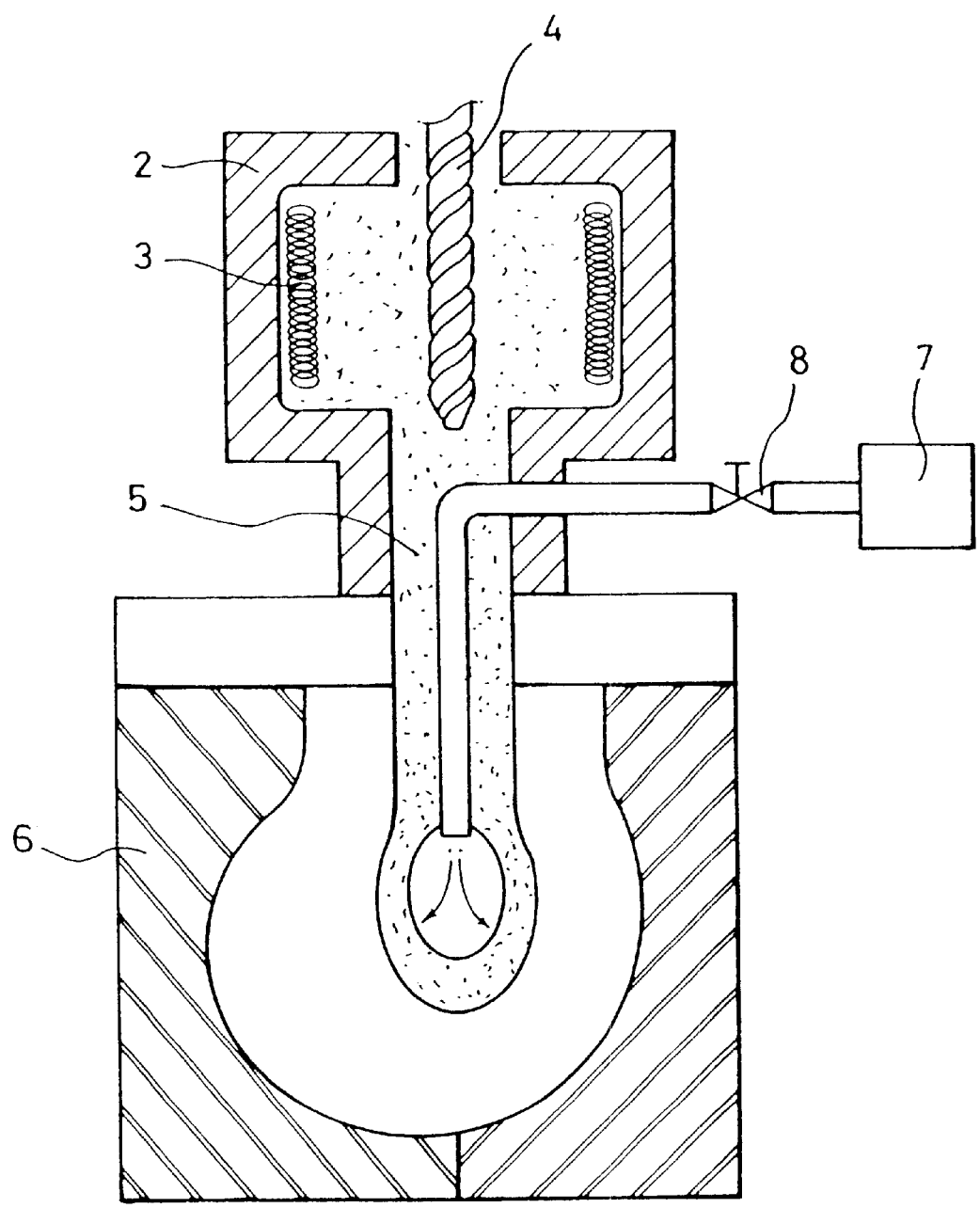
FIG. 3 is a flowchart illustrating process of manufacturing a helmet according to an embodiment of the present invention.
Figure 4:
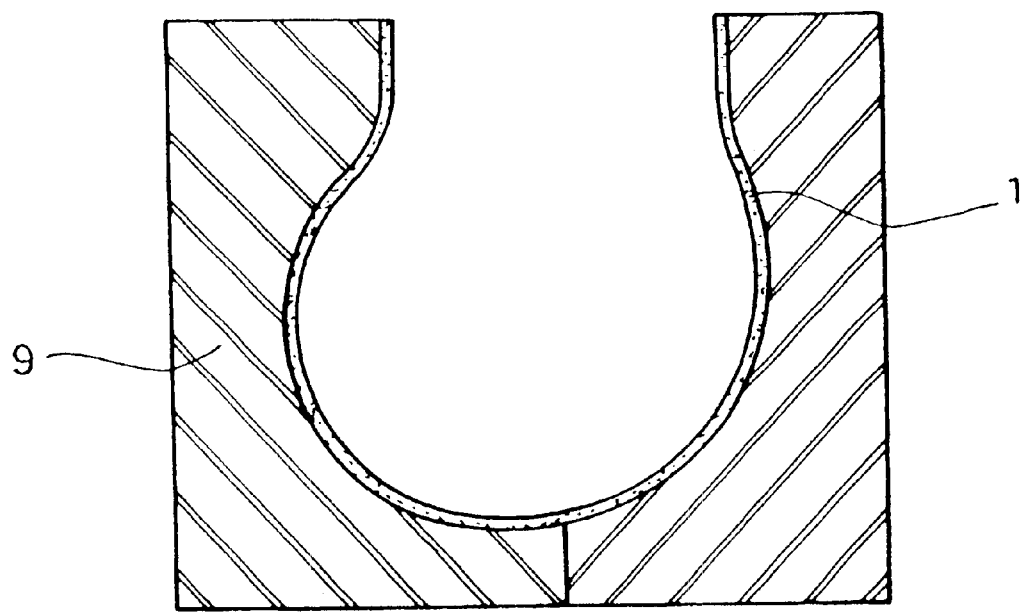
FIG. 4 illustrates a main body of helmet where an outer shell is mounted to a mold according to the present invention.
Figure 5:
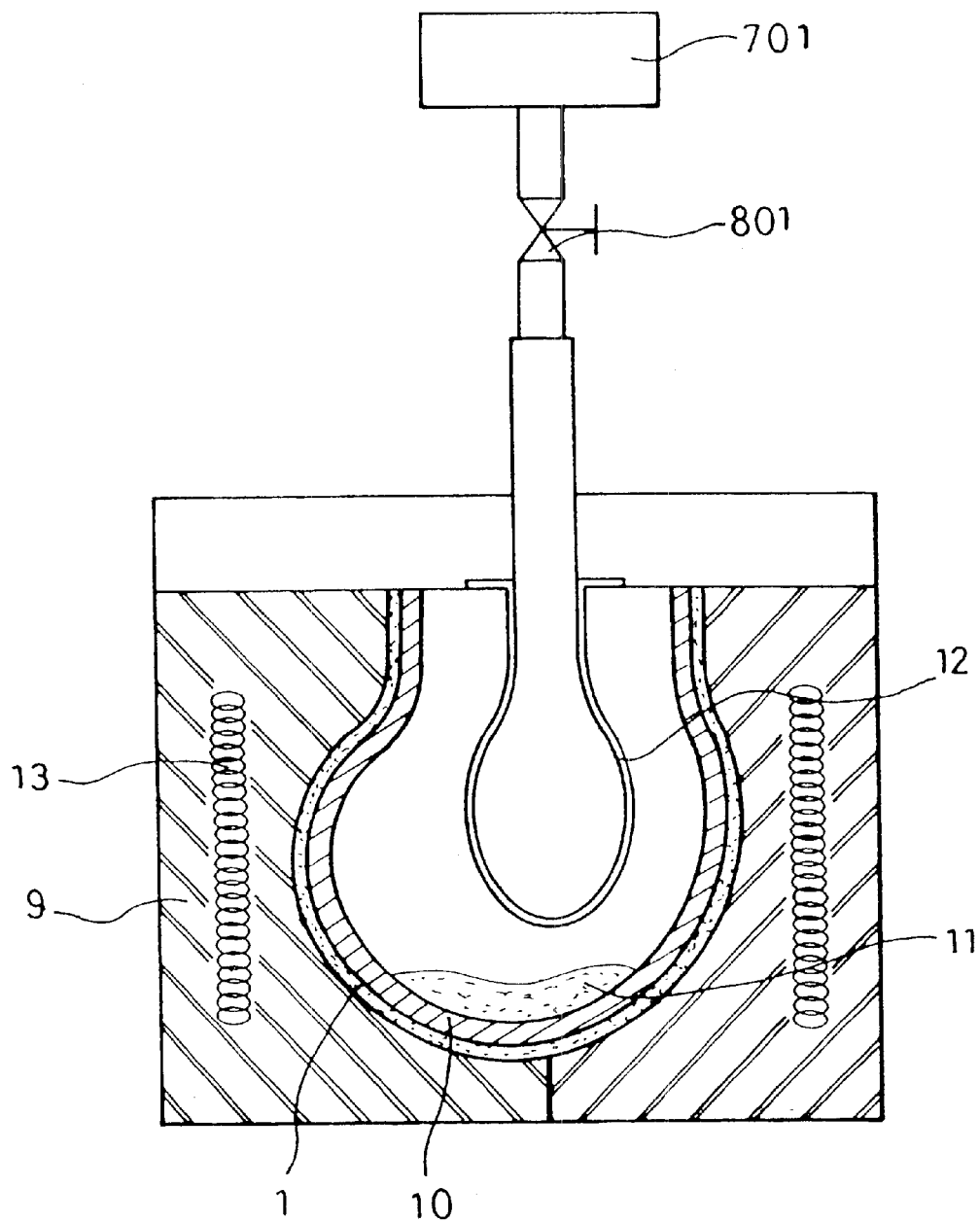
FIG. 5 is a flowchart illustrating another embodiment of the process of FIG. 3.

The present invention will be explained in more detail with reference to the attached drawings.

A helmet body of the present invention has dual-structure in that an outer shell formed of plastics, and an inner shell formed of FRP or a mixture of aramide fiber, polyethylene fiber, vinylon, and carbon fiber.

Embodiment 1

The outer shell is manufactured by a blow molding method or an injection molding method. A mold which is shaped as similar to the outer shell is arranged so as to accommodate the outer shell.

Then, substance like fiberglass mat, and polyethylene fiber is deposited into the outer shell to the desired amount, and thermosetting resin like polyester resin is added. Subsequently, the mold is heated at an appropriate temperature.

An air bag is mounted into the shell via the entrance of the mold, and an air is provided to the air bag at a high pressure so as to thereby expand the air bag in the mold. Thus-expanded air bag allows a rigid adhesion between the resin and the deposited substance of the interior of the outer shell. The mold is then isolated when the inner and outer shells are assembled to each other, thus obtaining a dual-structure helmet body.

Here, amount of deposited substance and resin applied to the interior of the outer shell can be controlled in accordance with the degree of strength or impact resistance of the helmet body, in consideration of usage of the helmet.

Embodiment 2

In this embodiment, the outer shell which is manufactured according to the above-described process is maintained in the mold, and deposition substance is provided to the interior of the outer shell. Then, the air bag is mounted into the mold and expanded, thereby producing a dual-structure helmet body.

Embodiment 3

In this embodiment, after the outer shell is molded, substance like fiberglass mat, and polyethylene fiber are adhered by one layer, respectively, in hand lay-up method using polyester resin, so as to obtain a predetermined thickness. Thickness of the substance constituting the inner shell is controlled in accordance with the usage of helmet.

In a method of manufacturing the outer shell by a blow molding method or an injection molding method, thermoplastic substance is provided to a hopper 2 having a heater 3 and heated so as to be melt down. Subsequently, the melt substance is provided to a mold 6 via a nozzle 5 using a screw 4.

Then, an air valve 8 of an air tank 7 is opened so that a molding can be performed with the substance evenly spread all over mold 6. When the molding of an outer shell 1 completes, mold 6 is isolated so that outer shell 1 can be extracted. Then, the molded outer shell is loaded to a mold 9 provided with an air bag 12.

Subsequently, substance 10 like fiberglass, polyethylene fiber is deposited into outer shell 1, and a polyethylene resin 11 is added thereto. Then, air bag 12 is mounted and expanded by being injected with air via an air tank 701 and a valve 801, to thereby strongly push substance 10 and polyethylene resin 11.

Heater 13 operates when air bag 12 expands so as to apply a heat to mold 9. Thus-applied heat allows a firm adhesion of an inner shell 14 onto an inner surface of outer shell 1, thereby manufacturing a helmet body of two-structure, say, inner and outer shells. Thus-manufactured helmet body is isolated from the mold, thus completing the process. Reference numeral 15 denotes an impact absorber mounted to the interior of the helmet.

Preferably, thus-manufactured outer shell has a thickness of approximately 0.5 mm to 10 mm, and has an aesthetically enhanced surface with an excellent strength and impact resistance.

As described above, a helmet body of the present invention has dual-structure made up of an outer shell formed of plastics and an inner shell formed of substances like FRP. The outer shell has an aesthetically enhanced outer surface performing a simplified process, while maintaining strength of the helmet. Thus, manufacturing cost is curtailed, and a painting on the outer surface of the helmet may perform conveniently eliminating the necessity of post-process of the outer surface of the helmet. As a result, an overall process is simplified.

What is claimed is:

1. A method of manufacturing a dual-structure helmet body, in which said dual-structure helmet is manufactured by molding an outer shell formed of plastics and performing an adhesion on an inner shell so as to be attached to said outer shell by a substance selected from the group consisting of fiber reinforced plastics (FRP), aramide fiber, vinylon, and carbon fiber, said outer shell is manufactured by a blow molding method and/or an injection molding method, a fiberglass mat and polyethylene woven fabric are deposited onto an inner surface of said outer shell, a resin is added thereto, and an air bag or a press is mounted into said outer shell so as to mold a helmet body.

2. A method of manufacturing a dual-structure helmet body according to claim 1, wherein said molded outer shell has an inner surface thereof deposited with a fiberglass mat and polyethylene woven fabric, said deposition is performed using a resin by a hand lay-up method.

* * * * *